(12) United States Patent
Ozaki

(10) Patent No.: US 7,199,536 B2
(45) Date of Patent: Apr. 3, 2007

(54) POWER STEERING DEVICE

(75) Inventor: Tetsuya Ozaki, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 15 days.

(21) Appl. No.: 10/484,693

(22) PCT Filed: Jun. 21, 2002

(86) PCT No.: PCT/JP02/06207

§ 371 (c)(1),
(2), (4) Date: Aug. 17, 2004

(87) PCT Pub. No.: WO03/011673

PCT Pub. Date: Feb. 13, 2003

(65) Prior Publication Data

US 2005/0007052 A1    Jan. 13, 2005

(30) Foreign Application Priority Data

Jul. 27, 2001    (JP) .............................. 2001-228095

(51) Int. Cl.
*H02P 1/00* (2006.01)
(52) U.S. Cl. .................. 318/139; 318/432; 318/434; 180/65.1; 180/65.2; 180/141; 180/142
(58) Field of Classification Search .............. 318/139, 318/489, 434, 432; 180/651, 65.2, 141, 142
See application file for complete search history.

(56) References Cited

U.S. PATENT DOCUMENTS

| | | | | |
|---|---|---|---|---|
| 3,990,534 A * | 11/1976 | Weisgerber | .................. | 180/417 |
| 4,077,484 A * | 3/1978 | Dezelan | ...................... | 180/252 |
| 4,557,342 A * | 12/1985 | Drutchas | ..................... | 180/442 |
| 4,582,155 A * | 4/1986 | Ohe | ........................... | 180/444 |
| 4,590,409 A * | 5/1986 | Kubota | ....................... | 318/139 |
| 4,624,283 A * | 11/1986 | Futaba | ................... | 137/625.24 |
| 4,624,334 A * | 11/1986 | Kelledes et al. | ............. | 180/446 |
| 4,756,375 A * | 7/1988 | Ishikura et al. | ............. | 180/446 |
| 4,881,611 A * | 11/1989 | Nakashima et al. | ........ | 180/404 |
| 5,194,794 A | 3/1993 | Shamoto | | |
| 5,299,650 A * | 4/1994 | Wada et al. | ................. | 180/446 |
| 5,712,551 A | 1/1998 | Lee | | |
| 5,829,547 A | 11/1998 | Fuji et al. | | |
| 5,899,292 A * | 5/1999 | Paul et al. | ................... | 180/419 |
| 6,016,881 A * | 1/2000 | Sakai et al. | ................. | 180/204 |
| 6,069,460 A * | 5/2000 | Grabowski et al. | ......... | 318/434 |
| 6,092,012 A | 7/2000 | Shimizu | | |
| 6,520,279 B2 * | 2/2003 | Fukumoto et al. | .......... | 180/446 |

FOREIGN PATENT DOCUMENTS

| | | |
|---|---|---|
| EP | 0 953 493 A1 | 11/1999 |
| EP | 1016582 | 7/2000 |
| JP | 2000-289634 | 10/2000 |

* cited by examiner

*Primary Examiner*—Rina Duda
(74) *Attorney, Agent, or Firm*—Rabin & Berdo, PC

(57) ABSTRACT

An electric power steering apparatus provides stable steering assist force by positively precluding actuation of an electric motor while it is rotating in a reverse direction, so as to prevent demagnetization of the electric motor. A motor reverse rotation detecting means detects whether or not the electric motor is rotating in the reverse direction and a motor actuation control actuates the electric motor when a condition for actuating the electric motor is fulfilled and on condition that the electric motor is not rotating in the reverse direction.

26 Claims, 4 Drawing Sheets

US 7,199,536 B2

POWER STEERING DEVICE

FIELD OF THE INVENTION

The present invention relates to a power steering apparatus which applies a steering assist force to a steering mechanism by a hydraulic pressure generated by a pump driven by an electric motor.

DESCRIPTION OF RELATED ART

Power steering apparatuses are known which assist operation of a steering wheel by supplying a working oil from an oil pump to a power cylinder coupled to a steering mechanism. The oil pump is driven by an electric motor, and a steering assist force corresponding to the rotation speed of the electric motor is generated by the power cylinder.

The power steering apparatus includes a steering shaft in which a torsion bar which twists according to the direction and magnitude of a steering torque applied to the steering wheel and a hydraulic pressure control valve whose valve aperture varies according to the direction and magnitude of the torsion of the torsion bar are incorporated. The hydraulic pressure control valve is interposed in a hydraulic pressure system between the oil pump and the power cylinder, and causes the power cylinder to generate a steering assist force corresponding to the steering torque.

Drive control of the electric motor is performed based on, for example, a steering angular velocity of the steering wheel. That is, the steering angular velocity is determined based on an output of a steering angle sensor provided in association with the steering wheel, and a target rotation speed of the electric motor is set based on the steering angular velocity. Voltage is applied to the electric motor so as to achieve the target rotation speed. More specifically, since the steering wheel is operated to a minor extent when the steering angular velocity is small, the electric motor is decelerated to a standby rotation speed, which is the lower limit of the target rotation speed. On the other hand, when the steering angular velocity is large, it is assumed that the steering wheel is operated to a large extent, and the electric motor is driven according to the steering angular velocity at the time so that a steering assist force is generated.

An electronic control unit provided for controlling the power steering apparatus performs an abnormality monitoring process for detecting abnormality in a sensor line or the like. When any abnormality is detected by the abnormality monitoring process, the electronic control unit carries out a fail-safe process to stop the electric motor. However, since occurrence of such a failure as breaking of the sensor line may be only temporary, there are times when the abnormal condition is brought back to a normal condition. In such a case, the electronic control unit actuates the electric motor again.

Also, there are times when a control process for stopping the electric motor is performed upon fulfillment of a condition, for example, the condition that the steering angular velocity continues to be lower than a predetermined level for more than a predetermined period of time. After the electric motor is stopped, the electronic control unit performs a process for actuating the electric motor in response to fulfillment of a predetermined condition for motor actuation such as the condition that the steering angular velocity reaches the predetermined level.

For the electric motor for driving the oil pump, for example, a brushless motor is adopted. Normally, the brushless motors are designed to rotate only in one direction.

However, when the brushless motor is stopped as a result of a fail-safe function or the like, sometimes the brushless motor is rotated in the reverse direction due to an outside force caused by residual pressure inside a hydraulic hose or the like. If, in such a case, the brushless motor is actuated as a result of recovery from an abnormal condition to a normal condition, the rotor of the brushless motor becomes subject to the opposite magnetic field. As a result, demagnetization of the brushless motor (change in magnetic force in the motor) occurs, making it impossible to achieve the exact motor output as specified.

For example, in FIG. 5, a case is assumed where the specification is designed so that electric current I in the brushless motor varies as indicated by a curve L0 with respect to load (steering torque) on the steering mechanism, and rotation speed of the brushless motor varies as indicated by a curve L10. In this case, when demagnetization of the brushless motor occurs, the characteristics are exhibited as indicated by curves L1 and L11, respectively. That is, it becomes unable to obtain desired outputs from given inputs of uniform driving current, and as the load increases, the rotation speed becomes lower than the desired level.

SUMMARY OF THE INVENTION

It is an object of the present invention to provide a power steering apparatus in which desired steering assist force can be stably provided by positively precluding actuation of an electric motor while it is rotating in a reverse direction so as to prevent demagnetization of the electric motor.

A power steering apparatus according to the present invention, which is adapted to generate a steering assist force by a hydraulic pressure generated by a pump (26) driven by an electric motor (27) comprises motor reverse rotation detecting means (15, 31, S5) for detecting whether or not the electric motor is rotating in a reverse direction and motor actuation control means (31, S7–S10, S2, S3) for actuating the electric motor when a predetermined condition for actuating the electric motor is fulfilled and on condition that reverse rotation of the electric motor is not detected by the motor reverse rotation detecting means.

Incidentally, the alphanumeric characters in the parentheses represent the corresponding elements and the like in the embodiment later described. However, this is not intended to be construed as limiting the invention to the embodiment.

With this arrangement, even when the predetermined condition for actuating the electric motor is fulfilled, actuation of the electric motor is disabled while the electric motor is rotating in the reverse direction. That is, the motor actuation control means actuates the electric motor only in a case where the electric motor is at a standstill or normally rotating in a predetermined direction. By this arrangement, actuation of the electric motor can be positively precluded while it is rotating in the reverse direction, so that demagnetization of the electric motor does not occur. As a result, the electric motor is able to generate the exact output as specified, thereby favorable steering assist can be accomplished.

The aforementioned motor actuation control means may be arranged so that, when the predetermined condition for actuating the electric motor is fulfilled, it actuates the electric motor after expiration of a predetermined standby period following a determination that reverse rotation of the electric motor is not detected by the motor reverse rotation detecting means.

With this arrangement, even when it is determined that the electric motor is not rotating in the reverse direction, the electric motor is actuated after expiration of a predetermined standby period. In a case, for example, where the rotation of the electric motor is detected by means of outputs of sensors such as hall sensors, there are times when reverse rotation of the electric motor cannot be exactly detected unless the electric motor is rotating in the reverse direction at a rotation speed not lower than a predetermined rotation speed. Therefore, according to this invention, the arrangement is made such that the electric motor is actuated after expiration of a predetermined standby period that is sufficiently long for the electric motor coasting at a rotation speed lower than a predetermined rotation speed to come to a halt. It is thus possible to more positively preclude actuation of the electric motor while it is rotating in the reverse direction.

In addition, the arrangement may be made such that when the electric motor is not rotating in the reverse direction, whether or not the electric motor is rotating in a normal direction is further detected, and upon detection of normal rotation of the electric motor, the electric motor is immediately actuated, and only in a case where neither normal nor reverse rotation of the electric motor is detected, the process waits for expiration of the predetermined standby period.

Detection of reverse rotation of the electric motor by the motor reverse rotation detecting means may be effected within an initial check period.

With this arrangement, since a detection of reverse rotation of the electric motor completes within the initial check period, the time required for the process for actuating the electric motor is not prolonged.

It is preferred that the time for detection by the motor reverse rotation detecting means and the predetermined standby period are set so that the predetermined standby period expires within the initial check period.

Also with this arrangement, the time required for the process for actuating the electric motor is not prolonged.

The predetermined condition for actuating the electric motor may include, for example, a steering speed reaching a predetermined level. Furthermore, the predetermined condition for actuating the electric motor may include a detection of recovery of the electric motor from a state of failure after stoppage thereof caused by a fail-safe function or the like.

The above stated or further objects, features and advantages of this invention will be better understood by the following description of a specific embodiment with reference to the accompanying drawings.

DESCRIPTION OF PREFERRED EMBODIMENT

Figure 1:
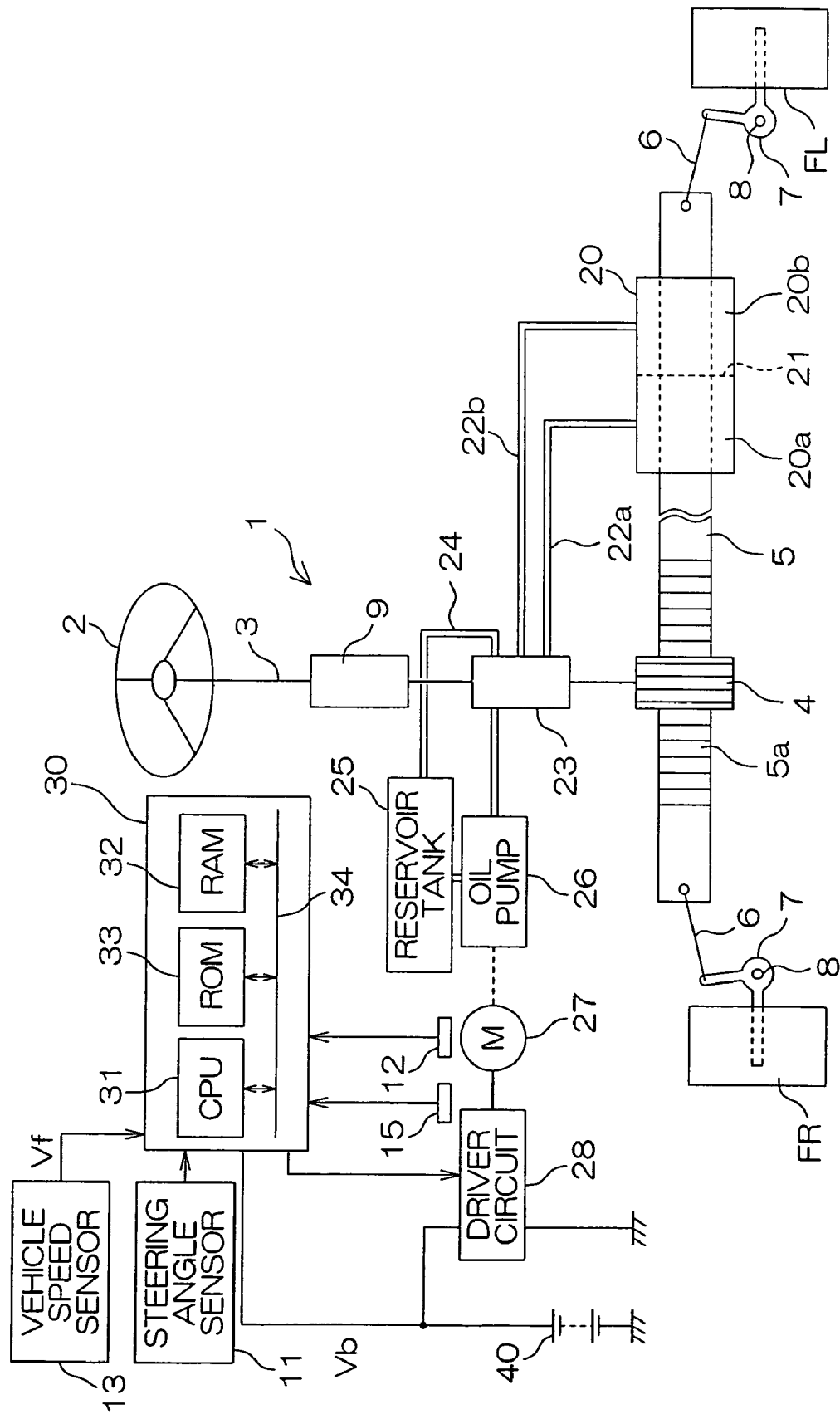
FIG. 1 is a schematic diagram showing the configuration of a power steering apparatus according to one embodiment of the present invention.

FIG. 1 is a schematic diagram illustrating the basic configuration of a power steering apparatus according to one embodiment of this invention. The power steering apparatus is provided in association with a steering mechanism 1 of a vehicle for providing a steering assist force to the steering mechanism 1.

The steering mechanism 1 comprises a steering wheel 2 driven by a driver, a steering shaft 3 coupled to the steering wheel 2, a pinion gear 4 provided at a distal end of the steering shaft 3, a rack gear 5a meshing with the pinion gear 4, and a rack shaft 5 extending transversely of the vehicle. Each of tie rods 6 are connected to each end of the rack shaft 5. The tie rods 6 are respectively connected to knuckle arms 7 that support left and right front wheels FL and FR as steerable vehicle wheels. The knuckle arms 7 are respectively provided rotatably around king pins 8.

In this arrangement, when the steering wheel 2 is operated to rotate the steering shaft 3, the rotational motion is converted by the pinion gear 4 and the rack shaft 5 into linear motion transverse to the vehicle body. The linear motion is converted into rotary motion of the knuckle arms 7 about the king pins 8, thereby turning the left and right front wheels FL and FR.

A torsion bar 9 which twists according to the direction and magnitude of the steering torque applied to the steering wheel 2 and a hydraulic control valve 23 whose valve aperture varies according to the direction and magnitude of the torsion of the torsion bar 9 are incorporated in the steering shaft 3. The hydraulic control valve 23 is connected to a power cylinder 20 that provides steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic control valve 23 through oil supply/return lines 22a and 22b, respectively.

The hydraulic control valve 23 is interposed in the course of an oil circulation line 24 that passes through a reservoir tank 25 and an oil pump 26. The oil pump 26 is driven by an electric motor 27, and pumps up working oil stored in the reservoir tank 25 to supply it to the hydraulic control valve 23. An excess of the working oil is returned from the hydraulic control valve 23 to the reservoir tank 25 via the oil circulation line 24.

When a torsion is exerted on the torsion bar 9 in one direction, the hydraulic control valve 23 supplies the working oil into one of the cylinder chambers 20a and 20b of the power cylinder 20 through one of the oil supply/return lines 22a and 22b. On the other hand, when a torsion is exerted on the torsion bar 9 in the other direction, the hydraulic control valve 23 supplies the working oil into the other one of the cylinder chambers 20a and 20b through the other one of the oil supply/return lines 22a and 22b. When virtually no torsion is exerted on the torsion bar 9, the hydraulic control valve 23 is in a state of so-called equilibrium, so that the working oil is not supplied to the power cylinder 20 but circulated in the oil circulation line 24.

When one of the cylinder chambers of the power cylinder 20 is supplied with the working oil, the piston 21 travels transversely of the vehicle. Thus, steering assist force acts on the rack shaft 5.

An exemplary construction of the hydraulic pressure control valve 23 is disclosed in detail, for example, in U.S. Pat. No. 4,624,283, the content of which is incorporated hereinto by reference.

The electric motor 27 comprises, for example, a brushless motor, and is controlled by an electronic control unit 30 through a driver circuit 28. The driver circuit 28 comprises, for example, a power transistor bridge circuit, and supplies electric power from an on-board battery 40 serving as power source to the electric motor 27 according to a control signal directed from the electronic control unit 30.

The electronic control unit 30 includes a microcomputer that operates on supply of electric power from the on-board battery 40. The microcomputer comprises a CPU31, a RAM 32 which provides a work area and the like for the CPU 31, a ROM 33 storing therein operation programs and control data and the like for the CPU 31, and buses 34 interconnecting the CPU31, RAM32, and ROM33 to one another.

The electronic control unit 30 is adapted to receive steering angle data outputted from a steering angle sensor 11. The steering angle sensor 11 is provided in association with the steering wheel 2, which outputs steering angle data in such a manner that the steering angle of the steering wheel 2 at a time when the engine is started upon actuation of the ignition key switch is set to an initial value "0", and steering angle data corresponding to a relative steering angle with respect to the initial value with a sign indicative of a steering direction is outputted. The CPU31 performs a calculation based on the steering angle data to determine a steering angular velocity corresponding to the time derivative of the steering angle data.

The electronic control unit 30 is also adapted to receive electric current detection signals from an electric current detection circuit 12 for detecting electric current flowing through the electric motor 27, and rotation speed signals from a rotation sensor 15 for detecting rotation direction and rotation speed of the rotor of the electric motor 27. The rotation sensor 15 may comprise, for example, hall sensors (normally plural in number) which are included in a brushless motor serving as the electric motor 27.

Further, the electric control unit 30 is adapted to receive vehicle speed signals outputted from a vehicle speed sensor 13. The vehicle speed sensor 13 may be adapted to detect the speed of the vehicle directly, or alternatively, adapted to determine the speed of the vehicle by calculation on the basis of output pulses of a vehicle wheel speed sensor provided in association with the vehicle wheels.

The electronic control unit 30 controls the electric motor 27 for driving thereof based upon steering angle data, electric current data and vehicle speed data provided from the steering angle sensor 11, the electric current detection circuit 12 and the vehicle speed sensor 13, respectively.

Figure 2:
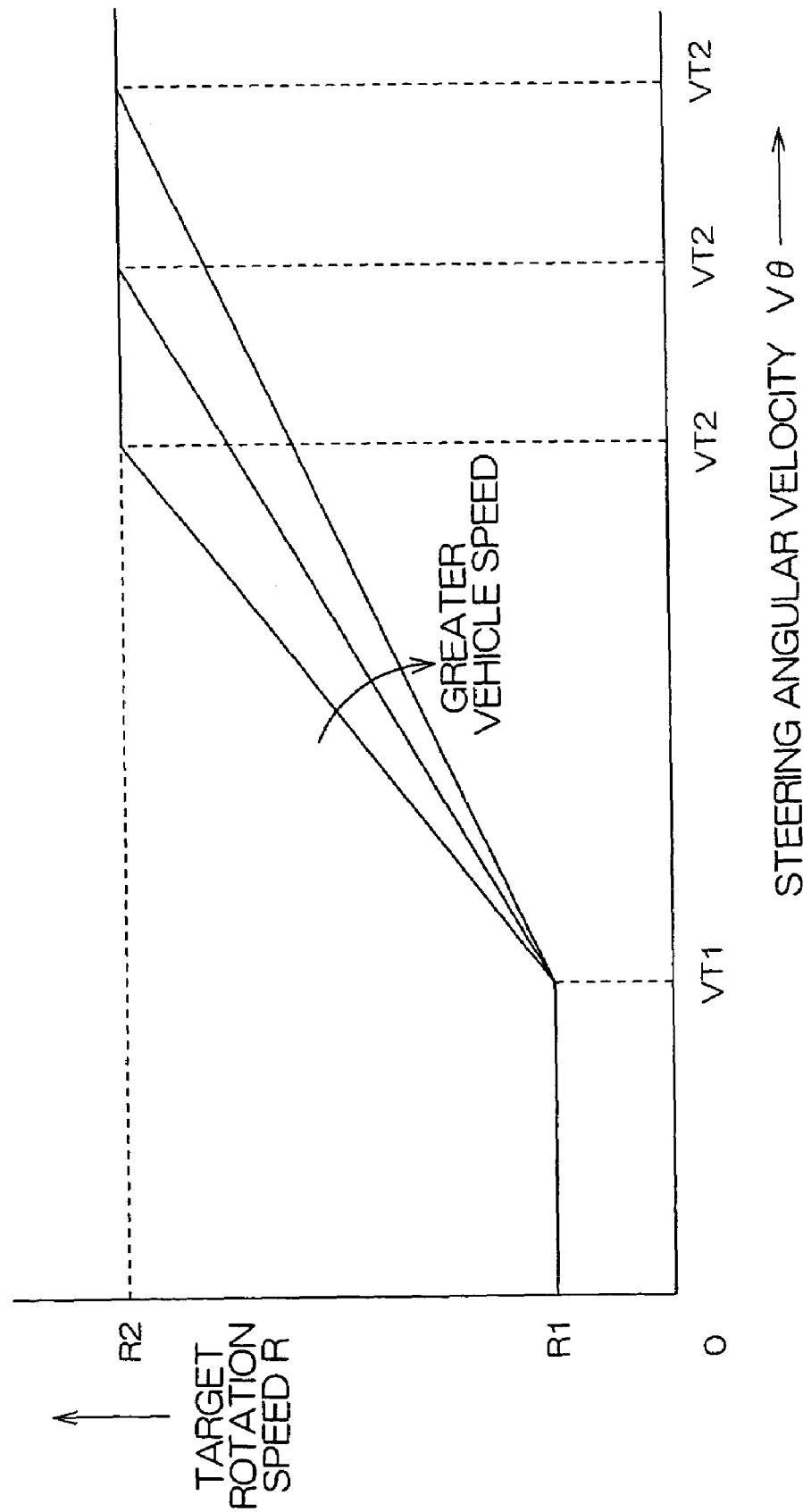
FIG. 2 is a diagram showing an example of the setting of a target rotation speed of an electric motor.

FIG. 2 is a characteristic diagram showing a corresponding relationship between steering angular velocity calculated on the basis of steering angle signals and target rotation speed of the electric motor 27. A target rotation speed R is determined between a lowest value R1 and a highest value R2 so that it monotonously (in this embodiment, linearly) increases between a first threshold value VT1 and a second threshold value VT2 set for steering angular velocity Vθ, which corresponds to steering speed. The lowest value R1 of the target rotation speed R within the monotonously increasing section is defined as standby rotation speed, and the electric motor 27 is rotationally driven at the standby rotation speed R1 for steering angular velocities lower than the first threshold value VT1.

The CPU31 sets the inclination of the target rotation speed R with respect to the steering angular velocity Vθ to be variable according to the speed of the vehicle as shown in FIG. 2. That is, the second threshold value VT2 is set to be variable according to the speed of the vehicle. More specifically, the greater the speed of the vehicle is, the greater value is set for the second threshold value VT2. Accordingly, the greater the speed of the vehicle is, the smaller is the value to be set for the target rotation speed R, so that the steering assist force is reduced. In this manner, vehicle speed sensitive control is effectually performed to generate steering assist force appropriate to the speed of vehicle.

Meanwhile, the CPU31 performs an abnormality monitoring routine for monitoring abnormalities in the respective sections constituting the system, and performs a fail-safe function upon occurrence of an abnormality to stop the electric motor 27, thereby preventing undesired steering assist from being performed. In the case of a temporary failure such as temporary breaking of a sensor line, there are times when the abnormal condition is brought back to a normal condition. In such a case, the abnormality monitoring routine issues a motor actuation instruction. In response to this, the CPU31 performs a process for actuating the electric motor 27 again.

Figure 3:
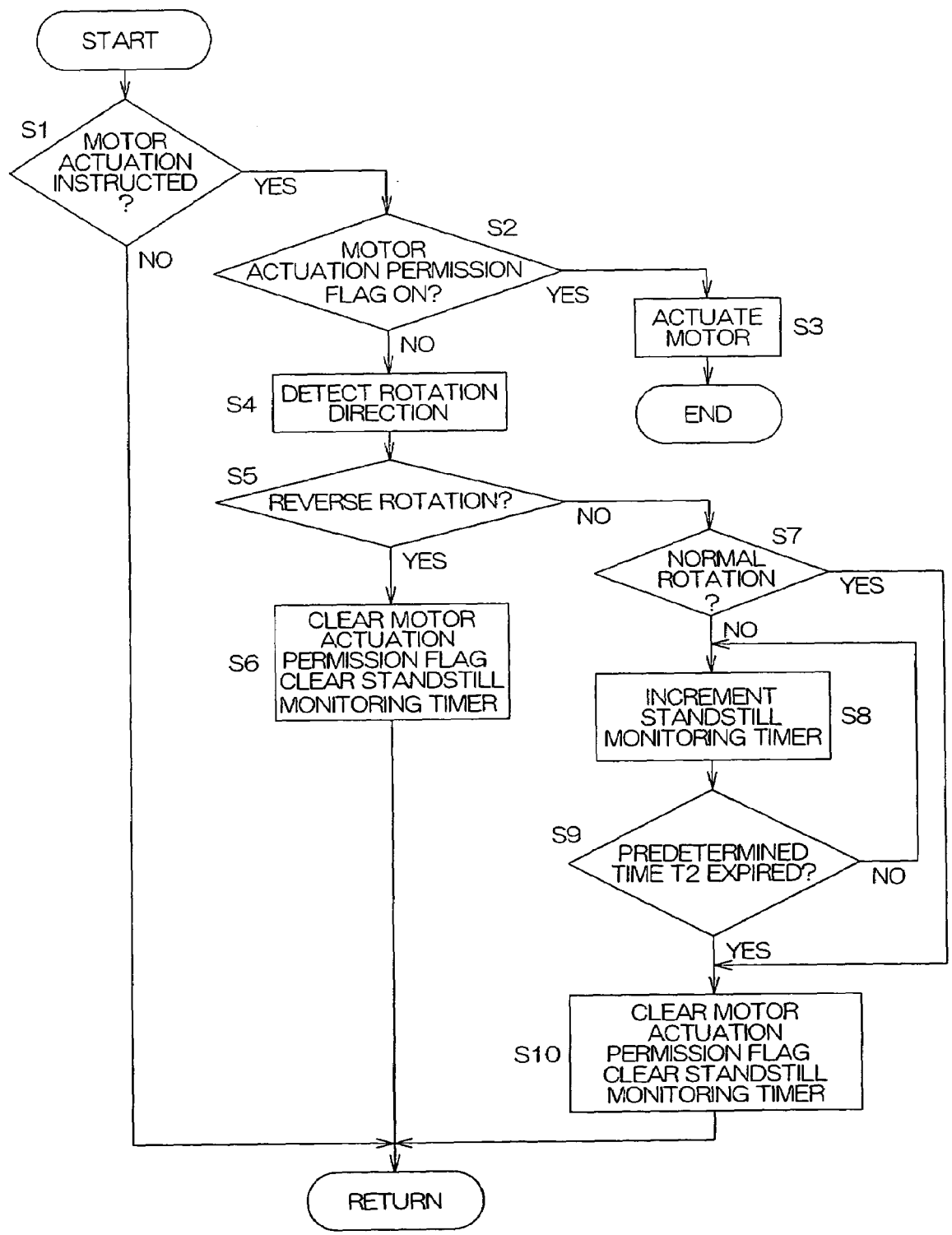
FIG. 3 is a flowchart illustrative of control for actuating the electric motor.

FIG. 3 is a flowchart illustrative of an electric motor actuation control process that the CPU31 repeatedly performs at every control cycle when the electric motor 27 is at a standstill. The CPU31 first determines whether a motor actuation instruction is issued or not (Step S1), and when the motor actuation instruction is not issued, the process returns. When the motor actuation instruction is issued (YES in Step S1), a motor actuation permission flag is checked. When the motor actuation permission flag is on (YES in Step S2), the electric motor 27 is actuated (Step S3).

When the motor actuation permission flag is clear (NO in Step S2), the output signal of the rotation sensor 15 (which is, for example, an output signal pattern of a plural number of hall sensors) is detected (Step S4), and then whether the electric motor 27 is rotating in the reverse direction or not is determined (Step S5).

The electric motor 27 is designed so as to generate the exact motor output as specified when it is rotated in one (the normal) direction. Accordingly, the hydraulic pressure system comprising the hydraulic pressure control valve 23 and the power cylinder 20 generates hydraulic pressure when the electric motor 27 is rotated in the normal direction. If a driving electric current is supplied from the driver circuit 28 while the electric motor 27 is coasting in the reverse direction, the electric motor 27 is driven to rotate in the normal direction from the state of reverse rotation. In this case, the aforesaid hydraulic pressure system does not generate the rated hydraulic pressure, and furthermore, demagnetization of the electric motor 27 occurs.

Therefore, when it is detected that the electric motor 27 is rotating in the reverse direction (YES in Step S5), the CPU31 clears the motor actuation permission flag and further clears a standstill monitoring timer for measuring standstill period of the electric motor 27 (Step S6), and then the process returns.

On the other hand, when it is determined that the electric motor 27 is not rotating in the reverse direction (NO in Step S5), the CPU31 further determines whether or not the motor 27 is rotating in the normal direction (Step S7). Detection of the rotation of the electric motor 27 on the basis of the output signal of the rotation sensor 15 comprising hall sensors or the like is possible only when the electric motor 27 is rotating in the normal or reverse direction at a rotation speed not lower than a predetermined rotation speed, and the rotation speed or rotation direction of the electric motor 27 cannot be detected while the electric motor is rotating at a low speed (e.g. lower than 1000 rpm). Accordingly, when the electric motor 27 is at a standstill or rotating at a low speed, the determination in Step S7 is negative.

When the CPU31 detects that the electric motor 27 is rotating in the normal direction (YES in Step 7), the CPU31 sets the motor actuation permission flag to on, clears the standstill monitoring timer (Step S10), and then the process returns. When, thereafter, the process in FIG. 3 is performed again, since the motor actuation permission flag is on, the process proceeds from Step S2 to Step S3, whereby the electric motor 27 is actuated.

When the electric motor 27 is at a standstill or rotating at a low speed, the determination in Step S7 is negative, and the standstill monitoring timer is incremented in Step S8. The CPU31 continues to increment the standstill monitoring timer until the timer reaches a predetermined standby period T2 (Steps S8, S9), and when the standstill monitoring timer reaches the end of the predetermined standby period T2, the CPU31 sets the motor actuation permission flag to on, clears the standstill monitoring timer (Step S10), and then the process returns.

The above mentioned standby period T2 is set at a period of time that is sufficiently long for coasting electric motor 27 to come to a halt when it is coasting at a rotation speed (for example, lower than 1000 rpm) that is lower than speeds at which the rotation sensor 15 is able to detect the rotating direction of the electric motor 27. That is, in cases where neither normal rotation nor reverse rotation of the electric motor 27 is detected, the electric motor 27 stops rotating by the time when the standstill monitoring timer completes measuring the standby period T2.

Figure 4:
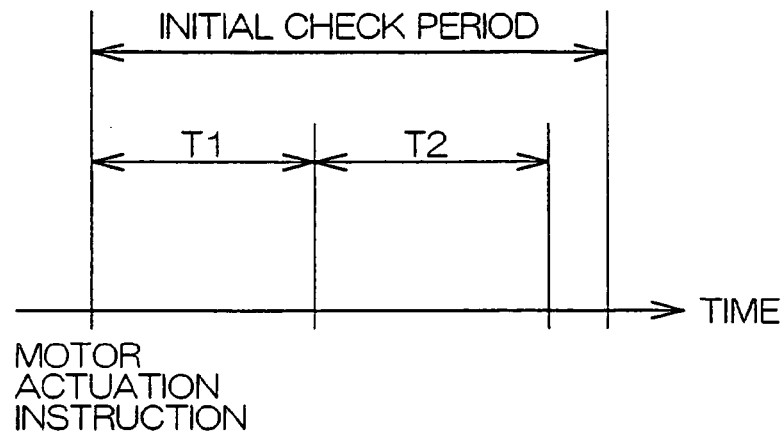
FIG. 4 is a time chart illustrative of a process during an initial check period performed for actuation of the electric motor.
Figure 5:
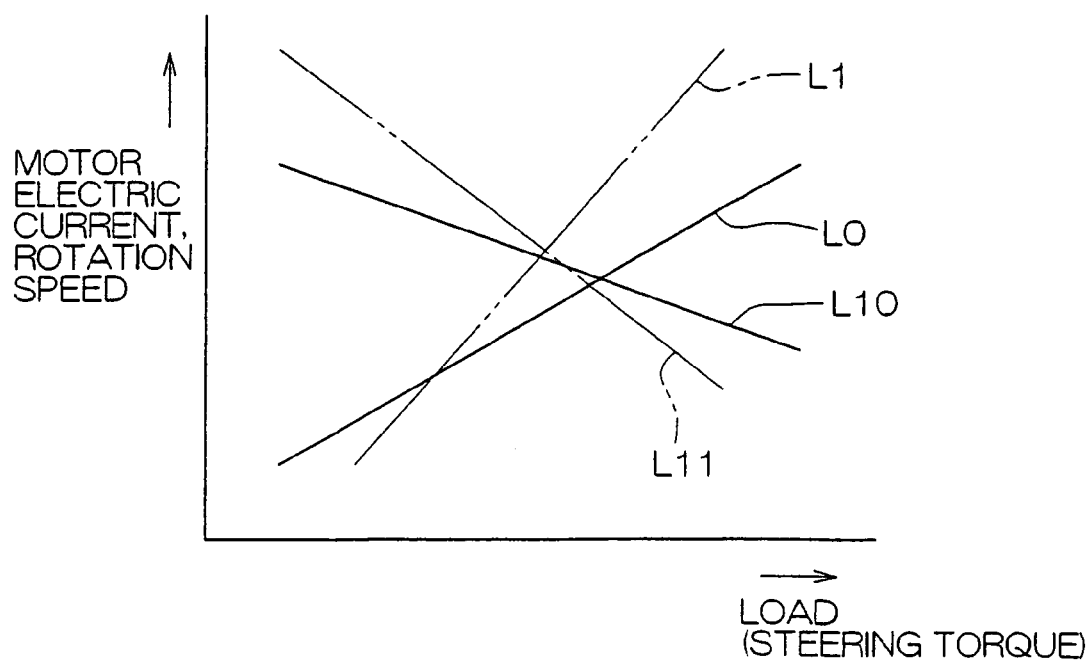
FIG. 5 is a diagram illustrative of variation in output characteristic due to demagnetization of the electric motor.

FIG. 4 is a diagram illustrating a relationship between the period of an initial check that the CPU31 performs for actuation of the electric motor 27 and the motor actuating process shown in FIG. 3. The CPU31 performs the motor actuating process shown in FIG. 3 during the initial check period, and refers to the output signal of the rotation sensor 15 during an initial time period T1 within the initial check period, thereby determining whether the electric motor 27 is rotating in the normal or reverse direction. The aforesaid standby period T2 that the standstill monitoring timer measures is set so that it expires after the lapse of the time period T1 within the initial check period. That is, the time period "T1+T2" is set to be shorter than the initial check period.

According to this embodiment, as described so far, whether or not the electric motor 27 is rotating in the reverse direction is determined within the period of the initial check performed for actuation of the electric motor 27. When reverse rotation of the electric motor 27 is detected, actuation of the electric motor 27 is disabled (YES in Step S5, Step 6).

On the other hand, when normal rotation of the electric motor 27 is detected (YES in Step S7), the motor actuation permission flag is set to on (Step S10), so that the electric motor 27 is actuated (Steps S2, S3).

In addition, when the rotation speed of the electric motor 27 is so low that detection of the rotation direction thereof is impossible or the electric motor 27 is at a standstill, after the lapse of the standby period T2 that is sufficiently long to bring the electric motor 27 to a halt (Steps S8, S9), the motor actuation permission flag is set to on (Step S10), and then the electric motor 27 is actuated (Steps S2, S3).

In the manner as described so far, actuation of the electric motor 27 can be positively precluded while it is rotating in the reverse direction. Therefore, demagnetization of the electric motor 27 does not occur and the electric motor 27 is able to stably generate the exact output as specified. As a result, favorable steering assist can be accomplished. Moreover, since the standby period T2 for detection of the rotating direction of the electric motor 27 and bringing it to a halt is set so that it expires within the initial check period for the motor actuation process, the time required for the motor actuation process will not be prolonged.

So far, a description has been given of one embodiment of the present invention. However, this invention may be embodied in other forms. For example, while the electric motor 27 is stopped upon detection of an abnormality and actuated as it is brought back to the normal state in the forgoing embodiment, a process at the actuation of the electric motor 27 maybe carried out by following the flowchart shown in FIG. 3 in a case where control is performed such that the electric motor 27 is stopped when the steering angular velocity continues to be lower than a predetermined level for more than a predetermined period of time and actuated in response to the steering angular velocity reaching the predetermined level.

In addition, the forgoing embodiment is arranged such that when it is detected that the electric motor 27 is not rotating in the reverse direction (YES in Step S5), whether or not the electric motor 27 is rotating in the normal direction is further determined (Step S7), and if the electric motor 27 is rotating in the normal direction, the motor actuation permission flag is immediately set to on (Step S10). However, the detection of whether or not the electric motor 27 is rotating in the normal direction is not necessarily required, and the determination in Step S7 of FIG. 3 may be skipped so that the step of waiting for expiration of standby period T2 is always performed when it is determined that the electric motor 27 is not rotating in the reverse direction.

While the present invention has been described in detail by way of the embodiment thereof, it should be understood that the foregoing disclosure is merely illustrative of the technical principles of the present invention and should not be construed as limiting the present invention. The spirit and scope of the present invention are defined only by the appended claims.

This application corresponds to Japanese Patent Application No. 2001-228095 filed with the Japanese Patent Office on Jul. 27, 2001, the disclosure thereof being incorporated herein by reference.

The invention claimed is:

1. A power steering apparatus, comprising:
   a steering motor which rotates in a normal direction in use;
   a pump which is driven by the steering motor and provides hydraulic pressure generated thereby to a steering mechanism as a steering assist force;
   motor reverse rotation detecting means for detecting whether or not the steering motor is rotating in a direction reverse of the normal direction; and
   motor actuation control means for actuating the steering motor to rotate only in the normal direction and only when, in combination, a predetermined first condition for actuating the steering motor to rotate in the normal direction is fulfilled and a second condition that reverse rotation of the steering motor is not detected by the motor reverse rotation detecting means is fulfilled.

2. The power steering apparatus according to claim 1, wherein detection of reverse rotation of the steering motor by the motor reverse rotation detecting means is effected within an initial check period.

3. The power steering apparatus according to claim 1, wherein when the predetermined first condition for actuating the steering motor is fulfilled, the motor actuation control means actuates the steering motor after expiration of a predetermined standby period following a determination that reverse rotation of the steering motor is not detected by the motor reverse rotation detecting means.

4. The power steering apparatus according to claim 3, wherein a time for detection by the motor reverse rotation detecting means and the predetermined standby period are set so that the predetermined standby period expires within the initial check period.

5. The power steering apparatus according to claim 3, wherein the predetermined standby period is set so that the duration thereof is sufficiently long for the steering motor to come to a halt when the steering motor is coasting at a rotation speed lower than a predetermined rotation speed.

6. The power steering apparatus according to claim 3, further comprising motor normal rotation detecting means for detecting whether or not the steering motor is rotating in the normal direction,
wherein, in a case where reverse rotation of the steering motor is not detected by the motor reverse rotation detecting means, the motor actuation control means immediately actuates the steering motor upon detection of normal rotation of the steering motor by the motor normal rotation detecting means, and only in a case where neither normal nor reverse rotation of the steering motor is detected, the motor actuation control means actuates the steering motor after expiration of the standby period.

7. The power steering apparatus according to claim 1, wherein the predetermined condition for actuating the steering motor includes that a steering speed is equal to or more than a predetermined level.

8. The power steering apparatus according to claim 1, wherein the predetermined first condition for actuating the steering motor includes detection of recovery of the steering motor from a state of failure after stoppage thereof caused by a fail-safe function.

9. The power steering apparatus according to claim 2, wherein when the predetermined first condition for actuating the steering motor is fulfilled, the motor actuation control means actuates the steering motor after expiration of a predetermined standby period following a determination that reverse rotation of the steering motor is not detected by the motor reverse rotation detecting means.

10. The power steering apparatus according to claim 4, wherein the predetermined standby period is set so that the duration thereof is sufficiently long for the steering motor to come to a halt when the steering motor is coasting at a rotation speed lower than a predetermined rotation speed.

11. The power steering apparatus according to claim 4, further comprising motor normal rotation detecting means for detecting whether or not the steering motor is rotating in the normal direction,
wherein in a case where reverse rotation of the steering motor is not detected by the motor reverse rotation detecting means, the motor actuation control means immediately actuates the steering motor upon detection of normal rotation of the steering motor by the motor normal rotation detecting means, and only in a case where neither normal nor reverse rotation of the steering motor is detected, the motor actuation control means actuates the steering motor after expiration of the standby period.

12. The power steering apparatus according to claim 5, further comprising motor normal rotation detecting means for detecting whether or not the steering motor is rotating in the normal direction,
wherein, in a case where reverse rotation of the steering motor is not detected by the motor reverse rotation detecting means, the motor actuation control means immediately actuates the steering motor upon detection of normal rotation of the steering motor by the motor normal rotation detecting means, and only in a case where neither normal nor reverse rotation of the steering motor is detected, the motor actuation control means actuates the steering motor after expiration of the standby period.

13. A power steering apparatus according to claim 2, wherein the predetermined first condition for actuating the steering motor includes that a steering speed is equal to or more than a predetermined level.

14. A power steering apparatus according to claim 3, wherein the predetermined first condition for actuating the steering motor includes that a steering speed is equal to or more than a predetermined level.

15. A power steering apparatus according to claim 4, wherein the predetermined first condition for actuating the steering motor includes that a steering speed is equal to or more than a predetermined level.

16. A power steering apparatus according to claim 5, wherein the predetermined first condition for actuating the steering motor includes that a steering speed is equal to or more than a predetermined level.

17. A power steering apparatus according to claim 6, wherein the predetermined first condition for actuating the steering motor includes that a steering speed is equal to or more than a predetermined level.

18. The power steering apparatus according to claim 2, wherein the predetermined first condition for actuating the steering motor includes detection of recovery of the steering motor from a state of failure after stoppage thereof caused by a fail-safe function.

19. The power steering apparatus according to claim 3, wherein the predetermined first condition for actuating the steering motor includes detection of recovery of the steering motor from a state of failure after stoppage thereof caused by a fail-safe function.

20. The power steering apparatus according to claim 4, wherein the predetermined first condition for actuating the steering motor includes detection of recovery of the lectric steering motor from a state of failure after stoppage thereof caused by a fail-safe function.

21. The power steering apparatus according to claim 5, wherein the predetermined first condition for actuating the steering motor includes detection of recovery of the steering motor from a state of failure after stoppage thereof caused by a fail-safe function.

22. The power steering apparatus according to claim 6, wherein the predetermined first condition for actuating the steering motor includes detection of recovery of the steering motor from a state of failure after stoppage thereof caused by a fail-safe function.

23. The power steering apparatus according to claim 7, wherein the predetermined first condition for actuating the steering motor includes detection of recovery of the steering motor from a state of failure after stoppage thereof caused by a fail-safe function.

24. The power steering apparatus according to claim 1, wherein the motor actuation control means positively precludes actuation of the steering motor while it is rotating in a reverse direction.

25. The power steering apparatus according to claim 1, wherein the steering motor is of a type which is susceptible to demagnetization if actuated while rotating in the direction reverse of the normal direction.

26. A power steering apparatus, comprising:
a steering motor which rotates in a normal direction in use;

a pump which is driven by the steering motor and provides hydraulic pressure generated thereby to a steering mechanism as a steering assist force;

motor reverse rotation detecting means for detecting whether or not the steering motor is rotating in a direction reverse of the normal direction; and motor actuation control means for actuating the steering motor to rotate in the normal direction when, in combination, a predetermined first condition for actuating the steering motor to rotate in the normal direction is fulfilled and a second condition that reverse rotation of the steering motor is not detected by the motor reverse rotation detecting means is fulfilled, wherein the motor actuation control means positively precludes actuation of the steering motor while it is rotating in the reverse direction.

* * * * *